United States Patent [19]
Okazaki

[11] Patent Number: 5,477,359
[45] Date of Patent: Dec. 19, 1995

[54] LIQUID CRYSTAL PROJECTOR HAVING A VERTICAL ORIENTATING POLYIMIDE FILM

[75] Inventor: Tsuyoshi Okazaki, Tenri, Japan

[73] Assignee: Sharp Kabushiki Kaisha, Osaka, Japan

[21] Appl. No.: 185,720

[22] Filed: Jan. 21, 1994

[30] Foreign Application Priority Data

Jan. 21, 1993 [JP] Japan .................................. 5-008298

[51] Int. Cl.⁶ .......................... C02F 1/1337; C02F 1/135
[52] U.S. Cl. ................................. 359/77; 359/72
[58] Field of Search ................... 359/77, 78, 72, 359/40, 92

[56] References Cited

U.S. PATENT DOCUMENTS

| | | | |
|---|---|---|---|
| 3,862,360 | 1/1975 | Dill et al. | 178/73 D |
| 4,103,297 | 7/1978 | McGreivy et al. | 340/324 M |
| 4,128,313 | 12/1978 | Cole, Jr. et al. | 350/340 |
| 4,239,346 | 12/1980 | Lloyd | 350/334 |
| 4,586,791 | 5/1986 | Isogai et al. | 350/341 |
| 4,624,531 | 11/1986 | Wada et al. | 350/340 |
| 5,148,298 | 9/1992 | Shigeta et al. | 359/72 |
| 5,251,049 | 10/1993 | Sato et al. | 359/40 |
| 5,329,390 | 7/1994 | Fujiwara et al. | 359/67 |

FOREIGN PATENT DOCUMENTS

| | | |
|---|---|---|
| 51-93195 | 8/1976 | Japan . |
| 56-92520 | 7/1981 | Japan ................................. 359/77 |
| 3-107925 | 5/1991 | Japan . |
| WO89/08862 | 9/1989 | WIPO . |

OTHER PUBLICATIONS

J. Janning, *Proceedings of Applied Physics Letter*, 21:173 (1972).
W. Urbach et al., *Proceedings of Applied Physics Letter*, 25:479 (1974).
F. Fahrenshon et al., *Proceedings of Journal of Electrochemistry Society*, 124:953 (1977).
W. Heffner et al., *Proceedings of Applied Physics Letter*, 36:144 (1980).
L. Rousille, *Proceedings of Applied Physics Letter*, 50:3975 (1979).
R. Filas et al., *Proceedings of Applied Physics Letter*, 50:1426 (1987).
S. Matumoto et al., *Proceedings of Applied Physics Letter*, 27:268 (1975).

Primary Examiner—Anita Pellman Gross
Assistant Examiner—Charles Miller
Attorney, Agent, or Firm—David G. Conlin; Peter F. Corless

[57] ABSTRACT

In the present invention, a liquid crystal projector has a reflective type liquid crystal element having opposed substrates and a liquid crystal layer between the substrates and projects a light image generated by the reflective type liquid crystal element. A orienting means of liquid crystal molecules provided in the reflective type liquid crystal element is a polyimide film with a vertical orientating characteristic as an orientation means. By rubbing the orienting means, a angle of inclination (pre-tilt angle) is predetermined. By using the reflective type liquid crystal element, the liquid crystal projector has a excellent light stability and a excellent display quality.

6 Claims, 13 Drawing Sheets

LIQUID CRYSTAL PROJECTOR HAVING A VERTICAL ORIENTATING POLYIMIDE FILM

BACKGROUND OF THE INVENTION

1. Field of the Invention

The present invention relates to a liquid crystal projector which is excellent in light stability.

2. Description of the Related Art

As a liquid crystal projector using a reflective type liquid crystal panel, for example, the display device having a high-density reflective type TFT-LCD has been reported (Y. Takubo et. al.,:Japan Display '89 p. 584 (1989)). This display device provides a reflective type liquid crystal panel which is arranged to form a pixel electrode made of a TFT on a TFT element through an insulated material for improving an aperture ratio and serving itself as a reflective panel.

The liquid crystal projector uses an optical addressed liquid crystal light valve. The optical addressed liquid crystal light valve is composed of a liquid crystal layer for modulating a reading out light according to change of a voltage, a light reflective layer for reflecting the reading ray, a light blocking layer for blocking a light transmitted from the light reflective layer, and a photoconductive layer for changing impedance according to the intensity of an incident light for controlling a voltage applied onto the liquid crystal layer, all of these components being sandwiched between transparent substrates made of glass. To drive the device, at first, an s.c. voltage is applied to the device. If no light (writing light) from the transparent substrate comes to the photoconductive layer, the bias voltage is mainly applied to the photoconductive layer. Further, if the writing light is applied to the device, the photoconductive layer lowers its impedance so that almost of the bias voltage may be applied to the liquid crystal layer, thereby modulating the reading light.

The operating mode used in the conventional liquid crystal light valve is a hybrid field-effect mode (abbreviated as a HFE mode) at which a nematic liquid crystal layer with positive dielectric anisotropy is twisted by 45°. If the voltage is applied onto the liquid crystal layer, the liquid crystal molecules respond to an electric field and tilt toward the vertical of the substrate. The polarizing direction of the incident light is rotated through the birefringent effect and the reflection caused by the tilted and twisted liquid crystal molecules. The ray whose polarization is rotated is transmitted through the polarizing beam splitter, so that the screen may be in a bright state. Considering that no voltage is applied, if a reading out light is reflected through the effect of a optical rotary power held by the liquid crystal, the direction of polarization provided at the ray incident time is kept constant so that the screen may be in the dark state. That is, assuming that an anisotropy in an index of refraction of the liquid crystal is $\Delta n$, a thickness of the liquid crystal layer is d, and a wavelength of an incident light is $\lambda$, the reflectance characteristic provided when the HFE mode in which applied voltage is off is made zero if $\cos(2\pi\Delta n.d/\lambda)=1$ (William. P. Bleha, Jan Grinberg, Alexander D. Jacobson and Gary D. Myer Hughes Research Laboratories, Malibu, Calif.:SID '77 Digest P. 104). That is, the reflectance characteristic at the OFF time depends on the wavelength. It will be understood from this fact that it is necessary to select the values of $\Delta n$, d and $\Delta$ in a manner to establish the relation of $(\Delta n.d/\lambda)=K$ (K is an integer) when designing the panel.

Further, as an operating mode of the liquid crystal display, it is possible to use a twisted nematic (TN) mode using nematic liquid crystal, a super twisted nematic (STN) mode, an electrically controlled birefrigence (ECB) mode, or a surface stabilized ferro electric liquid crystal (SSFLC) mode using ferroelectric liquid crystal. The ECB mode may be divided into three types based on the molecular orientation in the initialized state. Of these types, the deformation of vertical aligned phase type ECB mode keeps the liquid crystal vertically oriented in the initial state, because the nematic liquid crystal with a dielectric anisotropy is used. The electric field serves to tilt the liquid crystal molecules so that the birefrigence caused by the tilted molecules may cause the display to enter into a bright or a dark state. In the case that the liquid crystal molecules keep their orientation completely vertical, if any voltage is applied to the liquid crystal, the liquid crystal molecules are tilted at random, resulting in remarkably lowering the display quality. Hence, it is necessary to develop a technique of orienting the liquid crystal molecules widely over the glass substrate as keeping a uniform pre-tilt angle. If the pre-tilt angle is large, the birefringent effect serves to penetrate a light through the liquid crystal layer in the initial state, thereby lowering the contrast. It means that the pre-tilt angle has to be fine.

Some papers have reported techniques of keeping the liquid crystal in the tilted vertical orientating state.

The substrate is tilted by 85° (deposition angle $\phi=85°$) against the vertical of the substrate laid horizontally so that silicon oxide ($SiO_x$) may be deposited on the substrate in vacuum (oblique deposition). The thickness of the silicon oxide is about 70Å. The liquid crystal cell created by this method keeps the same orientation as the cell which was subject to the rubbing process. (J. L. Janning. Applied Physics Letter 21 p. 173 1972) Further, a heat cycle test (a reliability test executed to repeat a cycle of a room temperature to 250° C. to a room temperature 100 times) is executed for the cell created by the oblique deposition before or after injecting the liquid crystal. This results in keeping the orientation of the liquid crystal stable (W. Urbach et, al. Applied Physics Letter 25 p. 479, 1974). However, nothing about light stability is described in the papers.

There has been proposed a method in which after creating an inorganic film on the substrate by obliquely depositing $SiO_x$, the finishing is carried out. In this method, as a surfactant, CTAB (Cethyl-trimethyl-ammonium bromide) is used. The CTAB film is created by slowly and vertically pulling up the substrate from the surface of the CTAB solution. In the case that a CTAB density in the CTAB solution is sufficiently high, the vertical orientation is kept in the relation of $\phi<40°$ (W. Urbach et, al. Applied Physics Letter 25 p. 470 1974). However, since the CTAB is not chemically attached on the surface of $SiO_x$, it is well known that some or all of the CTAB is solved in the liquid crystal depending on a liquid crystal structure, a thickness of a liquid crystal layer and a temperature (Patent Lying Open No. Hei 2-503482 applied by the Hughes Aircraft Company). Hence, it is not expected that the CTAB formed on the surface or the CTAB solved into the liquid crystal is excellent in light stability under the high illumination.

Further, retisine or "T" acid is well known not as a surfactant agent but as a dopant to the liquid crystal (K. Fahrenschon and M. F. Schiekel Journal of Electrochemistry Society 124 p. 953 1977). By depositing SiO or magnesium fluoride ($MgF_2$) on the glass substrate in vacuum and at a depositing angle of 60° to 85° for forming a cell, the pre-tilt angle ($\theta p$) of 12° to 16° can be obtained. However, there is no description about light stability. In the following example, the finishing is done by using DMOAP (N, N dimethyl-N-octadecy 1-3-aminopropyltrimethoxysilil chloride) and a UTPFE (Ultrathin polyfluoroethylene) film on the surface on which SiO is deposited at an angle of $\phi=85°$ (W. R. Heffner et, al. Applied Physics Letter 36 p. 144 1980). The material of DMOAP can be obtained by dipping a DMOAP solution whose density is 0.003 to 0.03% on the SiO-deposited substrate and sintering the resulting substrate at a temperature of 80° C. The UTPFE film can be formed on the SiO-deposited substrate by introducing gaseous monomer to a vacuum device and performing a RF (Radio Frequency) plasma discharge between tabular electrodes provided inside of the vacuum device. When the deposited substrate with the DMOAP formed thereon is formed to be cellular and cyanobiphenyl liquid crystal, CB1, is sealed in the cell, the angle of $\theta p$ becomes $\theta p=16°$ to $26°$. Further, the substrate with the UTPFE film formed on the SiO material is formed to be cellular and CB7 is sealed into the cell, the angle of $\theta p$ becomes $\theta p=22°$ to $30°$. Further, when azoxy liquid crystal, HXAB, is sealed in the cell, the orientation is not tilted but completely vertical, however, the orientation changes with time. This paper does not have any description about light stability. In the next example, by coating a PTFE (polytetrafluoroethylene) film on the SiO surface whose SiO is deposited at an angle of $\phi=60°$, the pre-tilt can be obtained (L. Rousille and J. Robert Applied Physics Letter 50 p. 3975 1979). Since the angle of $\theta p$ depends on a film thickness of the PTFE film, the thickness is optimized. In the case of $d=20Å$, the angle of $\theta p=8°$ can be obtained. Though this cell is left in room temperature for several months, no change takes place in the orientation of the liquid crystal molecules. This paper does not have any description about light stability. As another method for keeping the vertical orientation of the liquid crystal molecules tilted, it has been reported to take the steps of mixing two kinds of silane coupling agent, MAP (N methylaminopropyltrimethoxysilane: to obtain a parallel orientation) and OTS (octadecyltriethoxysilane: to obtain a vertical orientation) at a certain ratio, diluting the mixed material with IPA (isopropyl alcohol), performing an orientating treatment on the glass substrate with the diluted solution, and then rubbing on the substrate (Robert W. Filas and J. S. Patel Applied Physics Letter 50 p. 1428 1987). In this method, by optimizing the rubbing strength, the angle of $\theta p=3°$ to $4°$ can be obtained. However, some disadvantages are referred in the paper. For example, the silane coupling agent solution changes with time and the orientation is not stable at a high temperature. This paper does not have any description about light stability. Further, as a method for obtaining a vertical orientating state, it has been reported to execute the orientating treatment by using a chromic chain (tetrachloro—$\mu$—hydroxo—$\mu$—carboxylatodichromium (III) complex) (Shoichi Matumoto et, al. Applied Physics Letter 27 p. 268 1975). The liquid crystal cell at a dynamic scattering mode produced by this method keeps a stable orientation for maximum 1500 hours at the driving aging test (which is a reliability test for applying alternate current of 50 Hz and 30 Vrms to the liquid crystal cell at a temperature of 60° C). However, this paper does not have any report about light stability.

Moreover, as a method for keeping the vertical orientation of the liquid crystal molecules tilted, it has been reported to obliquely depositing the material of $SiO_x$ ($x=1, 2$) and perform the finishing treatment with alcohol (Patent Lying Open No. Hei 2-508482, applied by Hughes Aircraft Company). The oblique deposition of $SiO_x$ is divided into two phases. At the first phase, $SiO_x$ is deposited at an angle of $\phi=20°$ to $40°$ (preferably, $30°$). At the second phase, the substrate is rotated $90°$ and the deposition is done at an angle of $\phi=2°$ to $10°$ (preferably, $5°$). In succession, by forming a surface alkoxy on the substrate by using the response to a long chained alcohol with a surface hydroxyl group, the tilted vertical orientation is allowed to be obtained. There is a description that the tilted vertical orientation obtained by this method indicates a light stability. However, since the dielectric anisotropy of the crystal liquid used in this paper is positive, the resulting angle of $\theta p$ is so large a value as $\theta p=6°$ to $45°$. Hence, in this method, it is difficult to obtain a fine pre-tilt angle. Moreover, the method for rubbing process on a vertically oriented polyimide film for obtaining a pre-tilt angle is applied to the liquid crystal display element in which a liquid crystal mixed with a chiral agent and a dichromatic dye are sealed (Japanese Patent Lying No. Hei 3-107925, applied by Stanley Electrics). In this paper, the display mode of the liquid crystal layer is limited as a guest host mode.

To project a full-color display, it is necessary to take the steps of dividing a white light into three colors, red, blue and green, forming an image about each of the colors, synthesizing the formed images, and expansively projecting the synthesized image through the effect of the optical system. As mentioned above, the HFE mode provides dependency of a wavelength on the reflectance characteristic at the applied voltage is off time. In designing a panel, it is possible to define parameters so as to meet the aforementioned conditions. However, it is a satisfactory condition to only a simple wavelength. The wavelength band of the divided ray is as broad as 100 nm. Hence, the dominant wavelength does not meet the aforementioned condition. Hence, the actual reflectance at the time of OFF is not disadvantageously made zero. This disadvantage puts a restriction to obtaining a high contrast at the HFE mode.

At the HFE mode, as shown in FIG. 4, a threshold voltage depends on the temperature too much. In the projection, it is originally likely that the panel is heated up to a temperature which is close to a reading light source. However, according to the continuous use of the projection system, the illumination of the light source is degraded. The temperature of the panel is made lower accordingly, so that the threshold voltage of the liquid crystal may be shifted to the high voltage side. Hence, the threshold voltage is shifted out of the optimized driving voltage, resulting in remarkably lowering the display quality.

FIGS. 5 and 6 show a voltage to reflectance (V-R) characteristic in the liquid crystal light valve at the HFE mode. FIG. 5 shows the V-R characteristic in the case of a large on-off ratio. FIG. 6 shows the V-R characteristic in the case of a small on-off ratio. Herein, the description will be oriented to a parameter of an on-off ratio. The peak of the V-R characteristic exists on the side of a high applied voltage if the writing ray of light does not come into the photoconductive layer (in the dark state) or on the side of a low applied voltage (in the photo state) if the writing ray of light comes into the photoconductive layer. The on-off ratio is defined by the following expression.

$$\text{on/off} = V_{Rmax\ dark}/V_{Rmax\ photo}$$

where $V_{Rmax\ dark}$: applied voltage given when a maximum reflectance is obtained in the dark state and $V_{Rmax\ photo}$: applied voltage given when the maximum reflectance in the photo state.

The HFE mode is inferior in acuteness of the reflectance characteristic. As shown in FIG. 6, hence, if the on-off ratio of the panel is low, no bright display cannot be disadvantageously obtained. The DAP type ECB mode is characterized in that it is superior in acuteness of the voltage to reflectance characteristic to the HFE mode and the perfect black can be displayed when no voltage is applied in the crossed-Nicol state.

However, the conventional method proposed for realizing the tilted vertical orientation required for the DAP type ECB mode has the following disadvantages. With the oblique deposition method, the pre-tilt angle of the liquid crystal greatly changes if the deposition conditions such as a deposition angle, a deposition speed, a vacuum level, a substrate temperature and a film thickness change or the liquid crystal material or the deposition material changes. Further, for the large substrate, it is very difficult to make the conditions equal with each other on the plane. Hence, it is difficult to obtain a uniform tilted vertical orientation on a large area with excellent reproducibility.

If the aforementioned conventional orientating method may apply to the projection, the sufficient light stability is required. However, up to now, no data about the light stability has been reported.

SUMMARY OF THE INVENTION

It is, therefore, an object of the present invention to provide a reflective liquid crystal display device which is capable of enhancing light stability required for projection, improving the contrast since the foregoing operating mode is used, and thereby realizing a high display performance.

The object of the invention can be achieved by a liquid crystal projector having a reflective type liquid crystal element including opposed substrates and a liquid crystal layer between said substrates, said projector for projecting a light image generated by said reflective type liquid crystal element, said projector comprising an orienting means disposed in said reflective type liquid crystal element for orienting liquid crystal molecules of said liquid crystal layer, said orienting means being made of a polyimide film with a vertical orientating characteristic, and being rubbed so as to orient said liquid crystal molecules at a predetermined angle of inclination as a pre-tilt angle.

In the reflective type liquid crystal element according to the aspect of the invention, the vertical orientated polyimide film is used as an orientation film of the liquid crystal layer, the orientation stability, coating property, chemical stability, heat-resistance, and light stability, the latter two of which are required for the projection, are increased, thereby improving the reliability.

Since the orienting means is rubbed so as to form a predetermined angle of inclination as a pre-tilt angle, it is possible to easily obtain a necessary fine pre-tilt angle over a wide range and with excellent reproducibility. Further, by changing the rubbing density as mentioned above, it is possible to freely control the pre-tilt angle.

Since the liquid crystal element according to the present invention uses a vertical orientating polyimide film for an orientation film formed on the liquid crystal layer, the orientation stability, coating property, chemical stability, heat-resistance, and light stability, the latter two of which are required for the projection, are increased, thereby improving the reliability.

Further, the present invention employs the DAP type ECB mode characterized as described above as an operating mode. This results in enhancing the contrast. In addition, as mentioned above, the dependency of a threshold voltage on the temperature is allowed to be improved.

As described above, according to the reflective type liquid crystal element of the present invention, it is possible to improve the light stability required for the projection. Moreover, since the foregoing operating mode is used, the contrast is made higher. The improved light stability and the high contrast make it possible to offer the reflective type liquid crystal element with a high display performance.

Further objects and advantages of the present invention will be apparent from the following description of the preferred embodiments of the invention as illustrated in the accompanying drawings.

DESCRIPTION OF THE PREFERRED EMBODIMENT

Later, the description will be oriented to the embodiments of the present invention with reference to the drawings.

The following embodiments show methods for fabricating reflective type liquid crystal elements provided for a liquid crystal projector of the present invention.

Embodiment 1 shows a method for fabricating an optical addressed liquid crystal light valve.

Embodiment 2 shows a method for fabricating a reflective type TFT-LCD in which a substrate opposed to the substrate into which a light comes is made of monocrystalline silicon.

Embodiment 3 shows a method for fabricating a reflective type TFT-LCD in which a substrate opposed to the substrate into which a light comes is made of a transparent substrate like glass.

Embodiment 1

Figure 1:
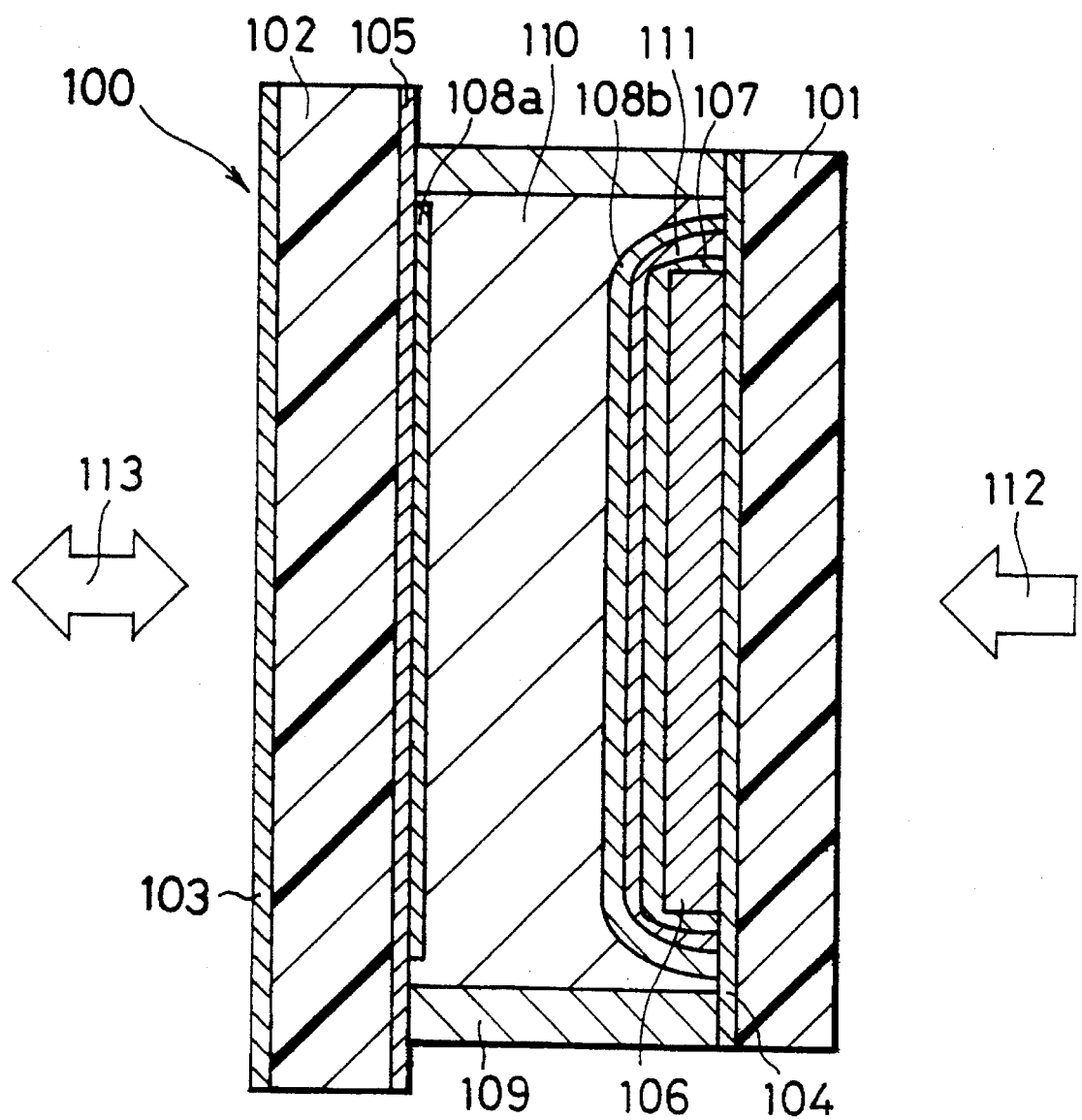
FIG. 1 is a sectional view showing a simplified arrangement of an optical addressed liquid crystal light valve according to the first embodiment.

FIG. 1 is a sectional view showing an arrangement of an optical writing type liquid crystal light valve according to an embodiment of the present invention. As shown in FIG. 1, the liquid crystal light valve 100 is arranged to have glass substrates 101 and 102, an anti-reflection film 103, a transparent electrode 104, an opposed electrode 105, a photoconductive layer 106, a light blocking layer 107, orientation films 108a and 108b, a spacer 109, a liquid crystal layer 110, and a dielectric mirror 111. This liquid crystal light valve 100 is fabricated as follows. At first, a transparent conductive film made of tin dioxide ($SnO_2$) is formed on the overall surface of the glass substrate 101 by means of the sputtering technique. The transparent conductive film is made to be the transparent electrode 104. Next, on the transparent electrode 104, a hydrogenerated amorphous silicon (a-Si:H) film is formed as the photoconductive layer 106. The a-Si:H film made of the photoconductive layer 106 is formed by means of the plasma CVD (Chemical Vapor Deposition) with a silane ($SiH_4$) gas and a hydrogen ($H_2$) gas as raw materials. The thickness of the a-Si:H film is about 6 μm. Then, on the photoconductive layer 106, there is formed the light blocking layer 107 for blocking the light coming from the liquid crystal layer 110 to the photoconductive layer 106 by spin-coating the carbon dispersed type acryl resin, The thickness of the light blocking layer 107 is about 1 μm. Next, on the light blocking layer 107, there is formed a multilayered film made of titanium dioxide ($TiO_2$) and silicon dioxide ($SiO_2$) as the dielectric mirror for reflecting the light coming from the liquid crystal layer 110 to the photoconductive layer 108 by means of the electron beam deposition method. On the side of the glass substrate 102 where a reading out of light 113 enters, the anti-reflection film 103 is formed for preventing the glass surface reflection of the light. In addition, it is possible to use a fiber plate provided in the glass substrate 101. On the glass substrate 102 opposed to the glass substrate 101, the opposed electrode 105 is formed by depositing a transparent conductive film made of indium oxide (ITO), formed by doping tin, by means of the sputtering technique. Next, on the opposed electrode 105 and the dielectric mirror 111, the vertically oriented polyimide film (manufactured by the Japan Synthesizing Rubber, Ltd.) is spin-coated and then is sintered at a temperature of 300° C. The resulting films are made to be the orientation films 108a and 108b. The thickness of the film is about 1000Å. Then, the orientating treatment is carried out on the orientation films 108a and 108b by means of the rubbing.

Figure 2:
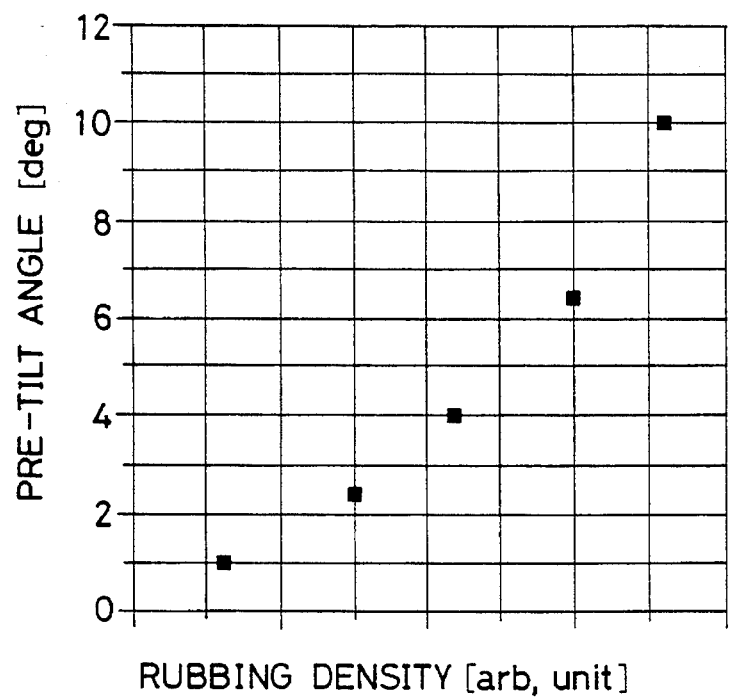
FIG. 2 is a graph showing a relation between a rubbing density and a pre-tilt angle.
Figure 3:
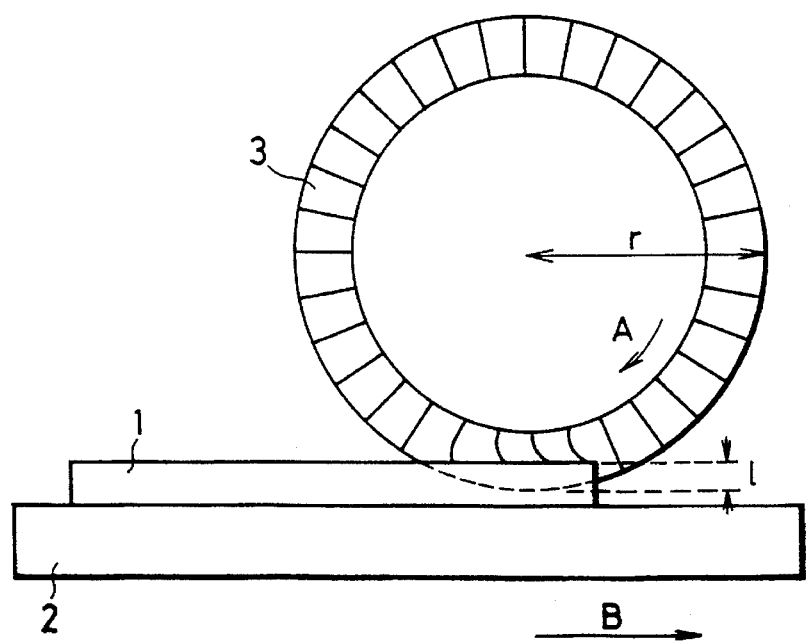
FIG. 3 is a sectional view showing a simplified arrangement of a rubbing device used in this invention.
Figure 16:
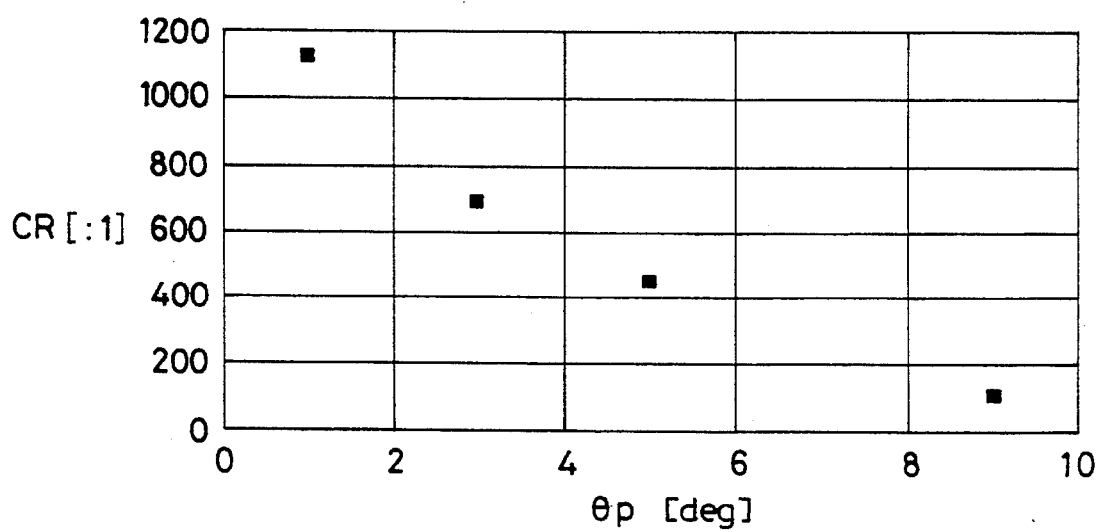
FIG. 16 is a chart showing a relation between a pre-tilt angle θp and a contrast ratio CR according to the present invention.

By the way, the rubbing density is defined as a rubbing density with parameters indicated by the following expression. (Proceedings of the thirteenth Liquid Crystal Debate, '87. P208) $L=N \cdot 1 \cdot \{1+(2\pi rn/60V)\}$
wherein L: rubbing density, N: rubbing times, l: contact length of pilus, n: number of revolutions of a roller, V: stage speed, and r: radius of a roller The pre-tilt angle can be easily controlled by changing the rubbing density L as mentioned above. As an example, a relation between the rubbing density and the pre-tilt angle in the case of rubbing the orientation film is shown in FIG. 2. Further, in the rubbing device shown in FIG. 3, a numeral 1 denotes a substrate. A numeral 2 denotes a stage. A numeral 3 denotes a rubbing cloth provided on the roller with a radius r. By rotating the roller toward the arrow A and traveling the stage toward the arrow B, the contact length 1 of the rubbing cloth against the substrate is maintained when performing the rubbing treatment. By the way, FIG. 1B shows a relation between a pre-tilt angle Op and a contrast ratio. As is obvious from FIG. 16, it is desirous to keep the pre-tilt angle 5° or less with respect to a vertical angle of substrate for obtaining such a high contrast ratio as exceeding 200:1, for example. In this embodiment, the rubbing is done at such a rubbing density as keeping the pre-tilt angle about 1°. The rubbing direction is anti-parallel. Then, the substrates are pasted through a spacer 109 serving as a seal so that a liquid crystal layer with dielectric anisotropy may be injected in vacuum. Then, the substrates are sealed. The sealed substrates are made to be the liquid crystal light valve 100.

Figure 12:
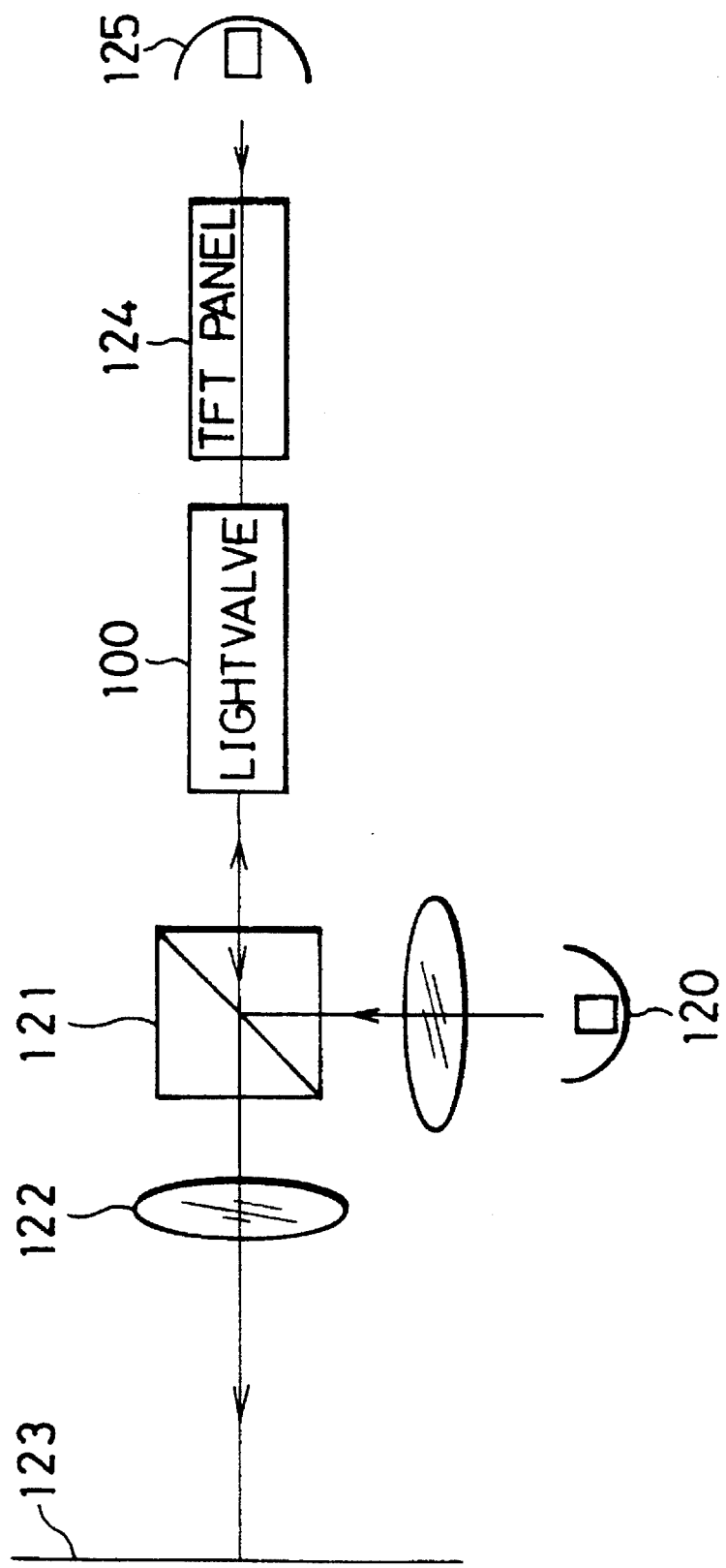
FIG. 12 is a view showing a projection system arranged to have a liquid crystal light valve according to the first embodiment produced by using the present invention.

FIG. 12 shows an example of a projection system arranged by the liquid crystal light valve 100 according to this embodiment. In this system, the ray of light from the reading light source 120 enters into the liquid crystal light valve 100 through a polarizing beam splitter 121. The image to be projected is formed by passing the light from the writing light source 125 through a TFT panel 124 and is written in the liquid crystal light valve 100. The reading light modulated inside of the liquid crystal light valve 100 is projected on a screen 123 through the polarizing beam splitter 121 and a lens system 122. The image projected by this system is very excellent.

By keeping the pre-tilt angle with the foregoing method, when a voltage is applied between the opposed substrates and the writing information enters into a transmissive substrate, the liquid crystal molecules fell down in a unidirection. In addition, the orientation required for the projection are increased in the light stability and the head resistance, thereby improving the reliability.

Figure 7:
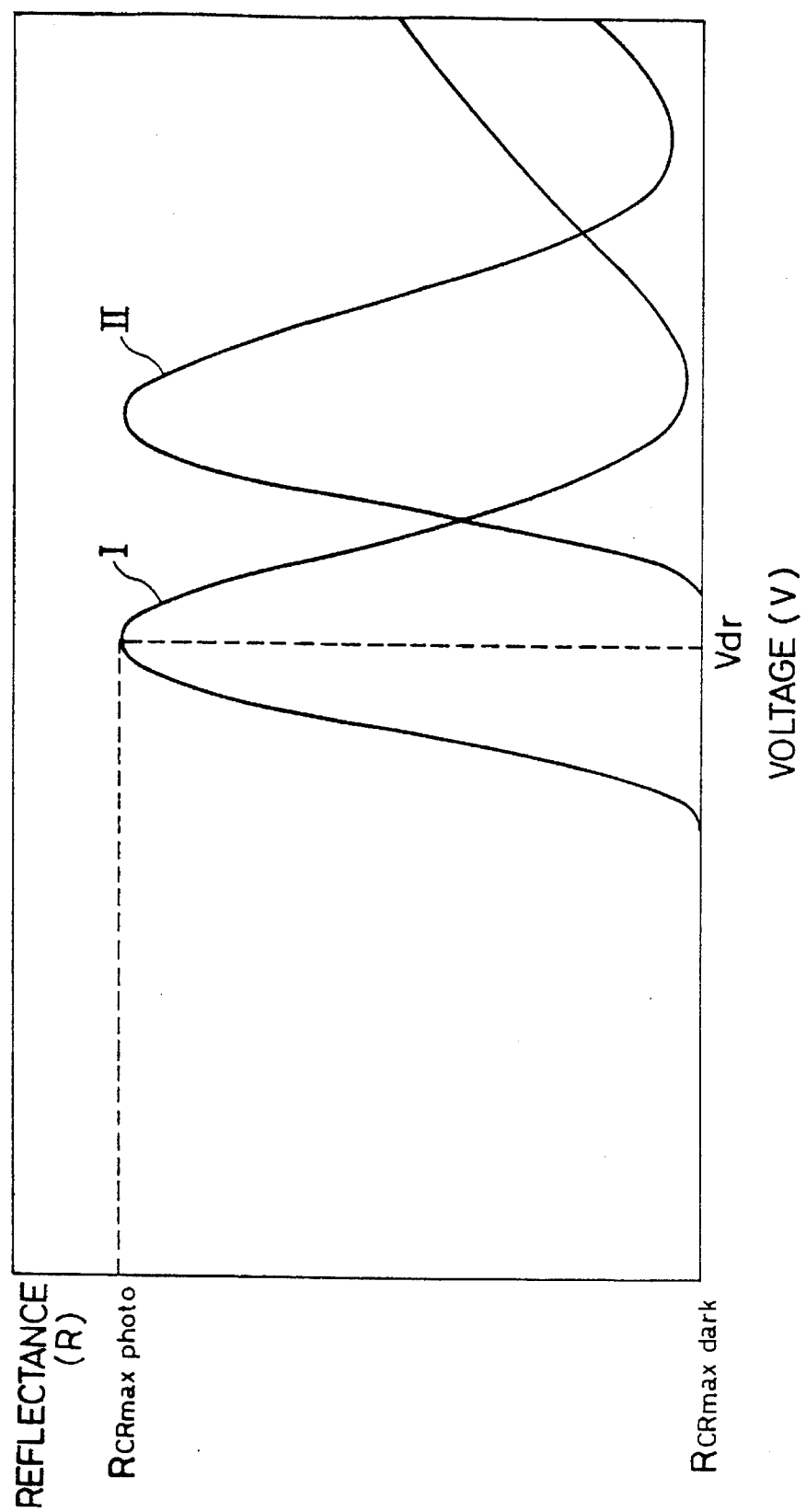
FIG. 7 is a chart showing a voltage to reflectance characteristic in the liquid crystal light valve at the DAP mode.

FIG. 7 is a graph showing a V-R characteristic provided in the liquid crystal light valve at the PAP mode. Further, Table 1 indicates one example of a display characteristic provided if the liquid crystal light valve at the HFE mode offers the same level of on-off ratio as the liquid crystal light valve at the DAP mode. The liquid crystal light valve at the DAP mode is superior in acuteness to the liquid crystal light valve at the HFE mode. Hence, the maximum contrast can be obtained around the maximum reflectance. Hence, in this embodiment, since the DAP mode having the foregoing features is used, it is possible to realize the projected image at high contrast.

TABLE 1

|  | HFE type liquid crystal light valve | DAP type liquid crystal light valve |
| --- | --- | --- |
| On–Off Ratio | 1.20 | 1.25 |
| Acuteness | 1.45 | 1.15 |
| $R_{CRmax}^{dark}$ (%) | 1.0 | 0.1 |
| $R_{CRmax}^{photo}$ (%) | 30.0 | 80.0 |
| Contrast Ratio | 30 | 800 | where $R_{CRmax}^{dark}$: minimum reflectance given at such an applied voltage as making the contrast ratio maximum and $R_{CRmax}^{photo}$: maximum reflectance given at such an applied voltage as making the contrast ratio maximum.

Figure 4:
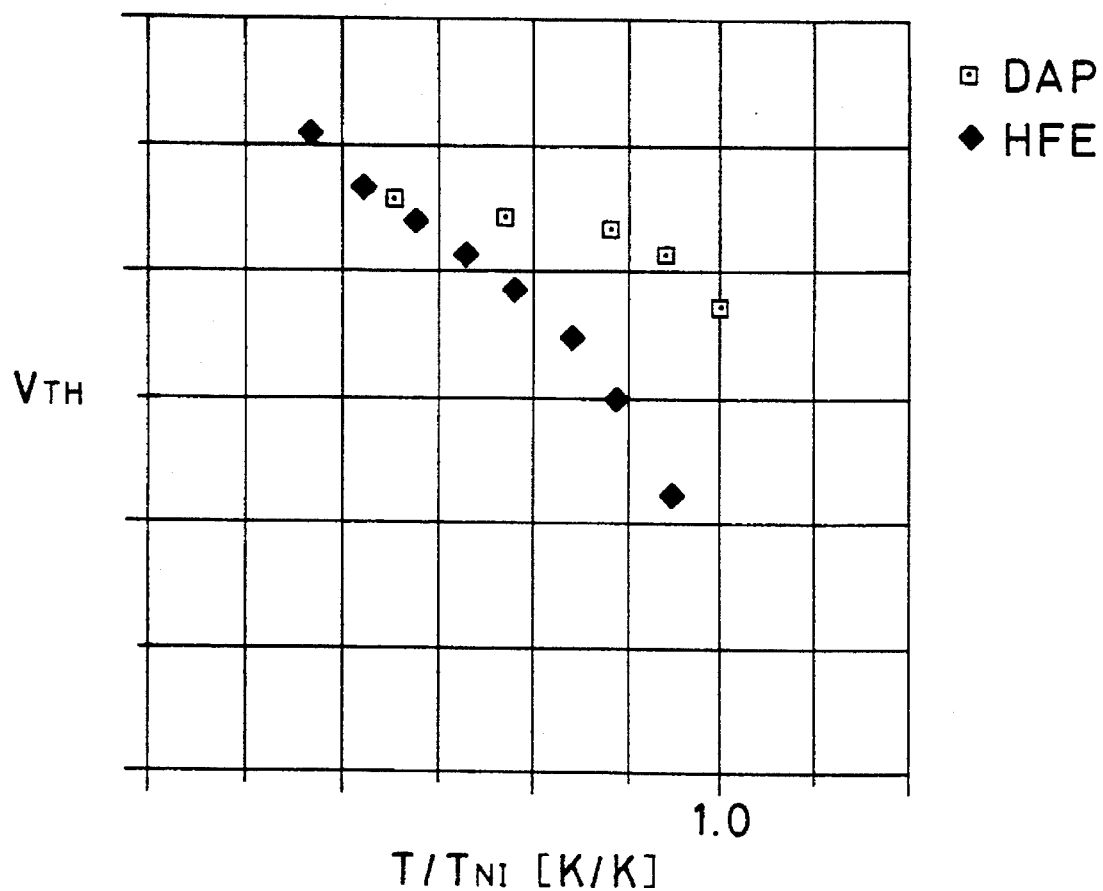
FIG. 4 is a graph showing a comparison of a temperature dependency of a threshold voltage in a liquid crystal light valve at DAP mode with a temperature dependency of a threshold voltage in an optical addressed liquid crystal light valve at HFE mode according to the present invention.
Figure 5:
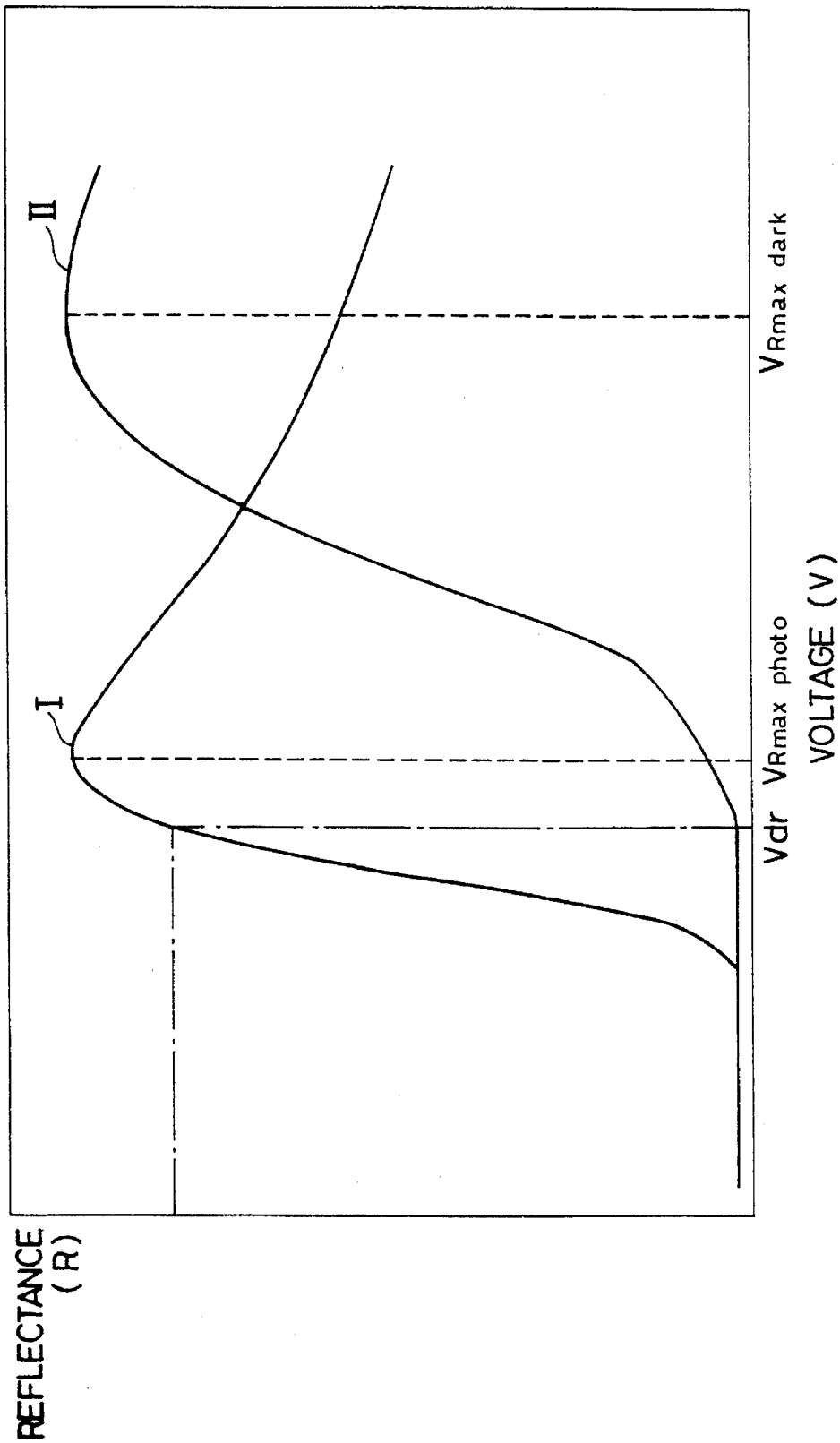
FIG. 5 is a chart showing a voltage to reflectance characteristic in the case of a large on-off ratio at the HFE mode.
Figure 6:
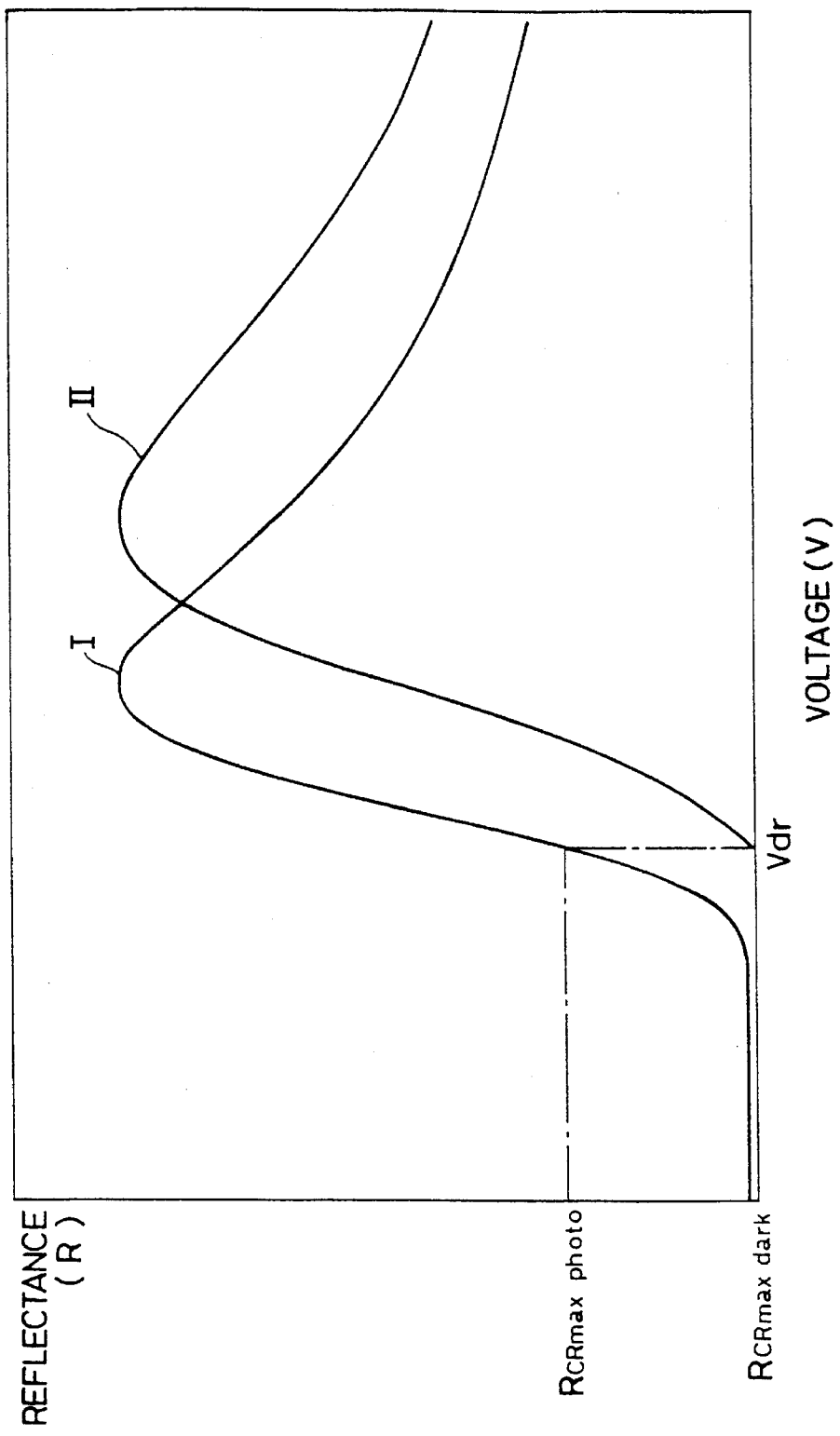
FIG. 6 is a chart showing a voltage to reflectance characteristic in the case of a small on-off ratio.

By the way, FIG. 4 shows how a threshold voltage $V_{Th}$ depends on the temperature in the DAP mode liquid crystal light valve arranged according to the present embodiment and the conventional HFE mode liquid crystal light valve. Each liquid crystal light valve is produced at the same condition except the liquid crystal layer. A transfer temperature $T_{NI}$ from the nematic phase to the isotropic phase of this embodiment is 83° C. and the same transfer temperature $T_{NI}$ of the HFE mode liquid crystal is 100° C. The threshold voltage $V_{TH}$ at the HFE mode liquid crystal is likely to shift to the low voltage side as the temperature is rising. As compared with it, the threshold voltage VTH of this embodiment substantially is maintained around $T_{NI}$. According to this embodiment, therefore, the dependency of the threshold voltage on the temperature is allowed to be greatly improved.

Embodiment 2

In this embodiment, the substrate opposed to the substrate where a ray comes is made of monocrysnalline silicon.

Figure 9:
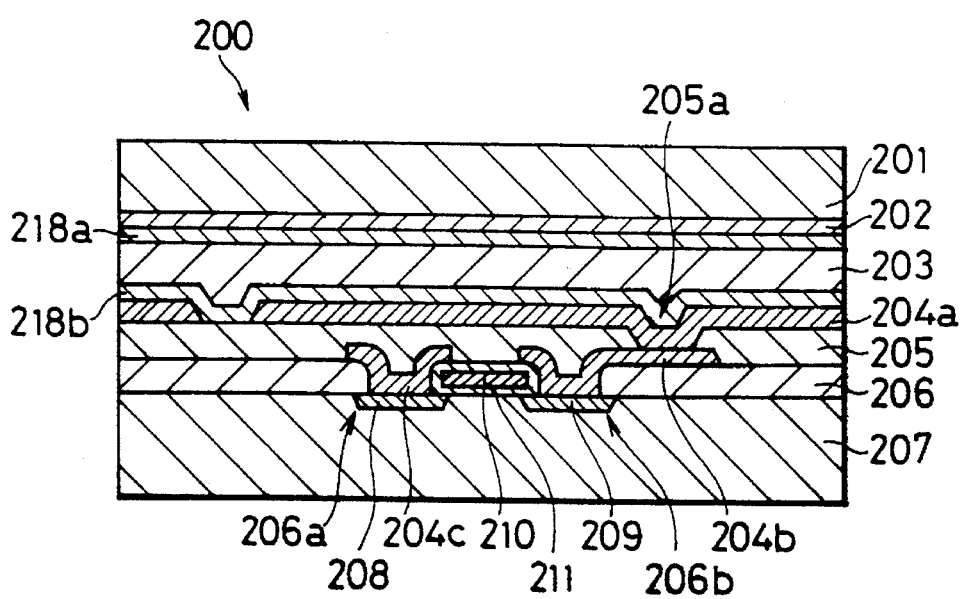
FIG. 9 is an explanatory view showing an arrangement of the second embodiment to which the present invention applies.

FIG. 9 shows a reflective type liquid crystal display device 200 to which the present invention applies. In this embodiment, a switching circuit composed of a silicon gate NMOS is mounted on the substrate. This element provides a monocrystalline silicon substrate 207 at the bottom, on which a field silicon oxide film 206 is formed. The field silicon oxide film 206 has holes. In the illustrative example, two holes 206a and 206b are prepared in the film 206. Inside of the holes 206a and 206b and on the top surface of the field silicon oxide film 206 around the upper edges of the holes 206a and 206b, aluminum electrodes 204b and 204c are formed in a manner to allow their bottoms to reach the monocrystalline silicon substrate 207. The defined parts of the monocrystalline silicon substrate 207 located under the aluminum electrodes 204b and 204c are made to be a source domain 208 and a drain electrode 209. Between the two holes 206a and 206b, a gate insulating film 211 and a gate electrode 210 are provided. The silicon oxide film is coated on the gate electrode 210 so as not to short-circuit the aluminum electrode 204c with the aluminum electrode 204b. This gate electrode 210 is made of polysilicon in this embodiment but may be made of another material.

On the aluminum electrodes 204c and 204b and the field silicon oxide film 206, a protective film 205 is formed. The protective film 205 is used for protecting the switching MOS circuit created on the monocrystalline silicon substrate 207. On the defined part of the protective film 205 corresponding to the aluminum electrode 204b, a hole 205a is formed. On the protective film 205 and inside of the hole 205a, a film 204a served as an electrode and a reflective film is formed in a manner to allow its bottom to reach the aluminum electrode 204b. This film 204a is made of aluminum having a high reflectance in this embodiment but may be made of another material. Further, the film 204a served as an electrode and a reflective film is required to perform heat treatment after forming the film 204a for lowering the contact resistance with the lower electrode 204b. At this time, however, the surface of the film 204a is made rugged so that the reflectance may be made lower. In this embodiment, the film 204a has a smooth surface. To enhance the reflectance, after forming the protective film 205 and performing the heat treatment after forming the film 204a, the surfaces of the films 205 and 204a are abraded for making them smooth. There is opposed on the film 204a a transparent glass substrate 201 having a transparent opposed electrode 202 formed on the overall lower surface. The transparent glass substrate 201 is used for the light-incident side. The liquid crystal layer 203 is created by the following method. On the opposed transparent electrode 202 and the film 204a served as an electrode and a reflective film, a vertically orientated polyimide film (manufactured by the Japan Synthesizing Rubber, Ltd.) is spin-coated and is sintered at a temperature of 300° C. The resulting film is an orientation film 218a or 218b. The thickness of the film is about 1000Å. Then, the orientating process is done on the orientation films 218a and 218b by means of the rubbing. In this embodiment, the rubbing is done at such a rubbing density as making the pre-tilt angle about 1°. The rubbing direction is anti-parallel. Next, both of the substrates are pasted and a liquid crystal material with a negative dielectric anisotropy is injected in vacuum between the substrates. By sealing the substrates, the reflective type liquid crystal display device 200 according to this embodiment is achieved.

According to the present invention, the use of the monocrystalline silicon substrate 207 makes it possible to directly apply an IC technique to the liquid crystal display device. It means that it is possible to apply highly advanced techniques such as a fine working technique, a high-quality thin film forming technique, a high accurate impurity introducing technique, a crystal defect controlling technique, a manufacturing technique and device, a circuit designing technique, and a CAD technique to the liquid crystal display device according to this embodiment. Hence, the adoption of the fine working technique of IC makes it possible to fine the pixel, thereby achieving a more high-definition display than the conventional device.

Further, in the conventional switching circuit, one or more thin film transistors are made of compensating capacitors. Hence, the switching circuit has a disadvantage that a low-resistance liquid crystal can not be used. According to the present invention, however, it is possible to arrange such a switching circuit as meeting the characteristics of each liquid crystal material such as a resistance value and a switching voltage of the liquid crystal, thereby being able to widely select any one of the liquid crystals. At this time, the switching circuit can be made on the lower silicon substrate provided in the pixel reflective plate. Hence, lowering of the effective display area of the element is allowed to be prevented.

Further, in addition to the switching circuit, the driving circuit, the logic circuit and the storage circuit are formed on the same substrate. Hence, addition of the logic function of the display device is made possible. In addition, the clean room in the existing IC factory may be used and thereby the other equipment investment is not required. It means that the manufacturing cost is advantageously made lower.

Concrete Example 1

If a pixel is reduced by using the fine working technique of ICs which is one of the features of this invention, it is possible to produce a reflective type liquid crystal display device which corresponds to a small-sized high-vision. For example, in a case that the pixel pitch is set as 20×25 μm² (vertical×horizontal) and the number of pixels is 1000× 1400, the composed display device has a display dimension of 20×35 mm² and a diagonal of 1.6 inch. In actual, it is necessary to integrally form the driving circuit on the peripheral part of the substrate around the display. Hence, the dimension of the monocrystalline silicon substrate 207 for the element is 30×45 mm². In addition, the liquid crystal is produced by the same method as the liquid crystal layer 110 of the embodiment 1.

The three liquid crystal element produced as described above are used for composing a color projecting type TV. Since the display of such a TV is bright and the liquid crystal display element is small in size, the optical system provided in the TV may be made smaller, thereby making the projection TV itself compact.

Concrete Example 2

Figure 10:
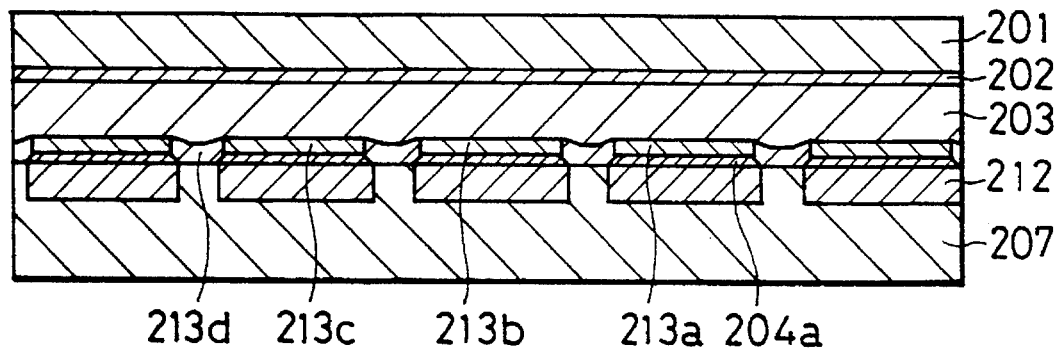
FIG. 10 is an explanatory view showing an arrangement of the concrete example 2.

The pixel described in the foregoing concrete example 1 is divided into three parts and a R (red), a G (green) and a B (blue) color filters are attached to each of the parts. The resulting structure is made to be a reflective type color liquid crystal display element composed of just one display element. FIG. 10 shows a simplified sectional view showing the arrangement of the display element. On the top layer of the monocrystalline silicon substrate 207, there is formed one combination of three switching circuit areas 212 for the liquid crystal. On each switching circuit area 212, each film 204 served as an electrode and a reflective film 204a is formed. On the overall surface of the monocrystalline silicon substrate 207, there is formed a gelatin film. The part of the gelatin film corresponding to one switching area 212 is dyed red, for serving as a red color filter 213a. The parts of the gelatin film corresponding to the other switching areas are dyed green and blue, for serving as a green color filter 213b and a blue color filter 213c. The other part of the gelatin film is a gelatin non-dye area 213d. The formation of the gelatin film and the dying technique have been already developed for the CCD. Hence, the conventional facility and technique can be used. In the liquid crystal layer 203 shown in FIG. 10, the orientation film and the liquid crystal layer are not shown.

Figure 13:
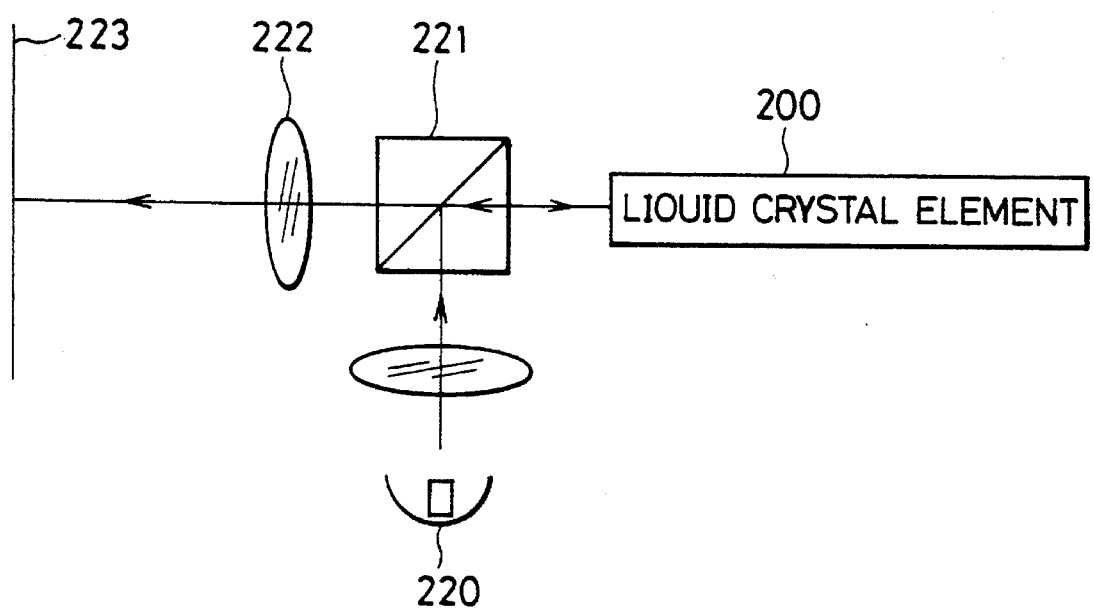
FIG. 13 is a view showing a projection system arranged to have a reflective type liquid crystal element according to the second embodiment produced by using the present invention.

FIG. 13 shows an example of a projection system arranged by the reflective type liquid crystal element according to the present embodiment. In this system, a ray of light from the light source 220 enters into a reflective type liquid crystal element 200 through a polarizing beam splitter 221. The light modulated according to the image information projected inside of the reflective type liquid crystal element 200 is projected onto a screen 223 through the polarizing beam splitter and a lens system 222. The image projected by this system is quite excellent.

With the display device arranged as indicated above, it is possible to realize a miniaturized projection type color TV. Further, it may be applied to OA equipment except the TV.

Concrete Example 3

Figure 11:
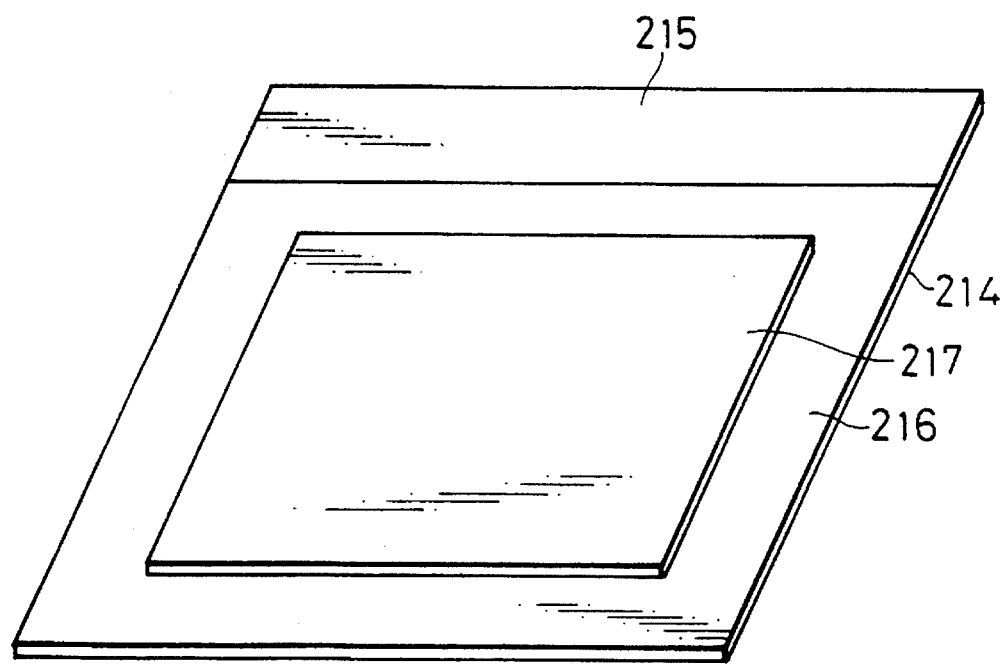
FIG. 11 is an explanatory view showing an arrangement of the concrete example 3.

One of the features of the present invention is the production of a logic circuit, a storage circuit and the like on the same substrate, because the monocrystalline silicon substrate is used. FIG. 11 shows an exemplary arrangement in which an image processing unit is mounted.

In FIG. 11, a numeral 214 denotes a monocrystalline silicon substrate. On the center of the substrate 214, there is formed a liquid crystal display unit 217, around which a liquid crystal driving circuit unit 216, a storage circuit, an image processing circuit 215 and the like are formed. An input signal is processed in the storage circuit, the image processing circuit 215 and the like. The processed signal is transferred to the liquid crystal driving circuit unit 216 for operating the liquid crystal display unit 217.

In the arrangement as described above, according to the present invention, the display device and the image processing unit are formed integrally. This example indicates the display device having an image processing unit mounted thereon. Another functional unit except the image processing unit may be integrated with the display device.

Further, according to the foregoing embodiment, the silicon gate NMOS is mounted. This embodiment is not limited to the silicon gate NMOS but may contain one or more of all the components used in the conventional ICs using a monocrystalline silicon substrate such as a monocrystalline MOS structure, a bipolar structure, a diode, a resistor, and a capacitor mounted thereon.

Embodiment 3

Figure 14:
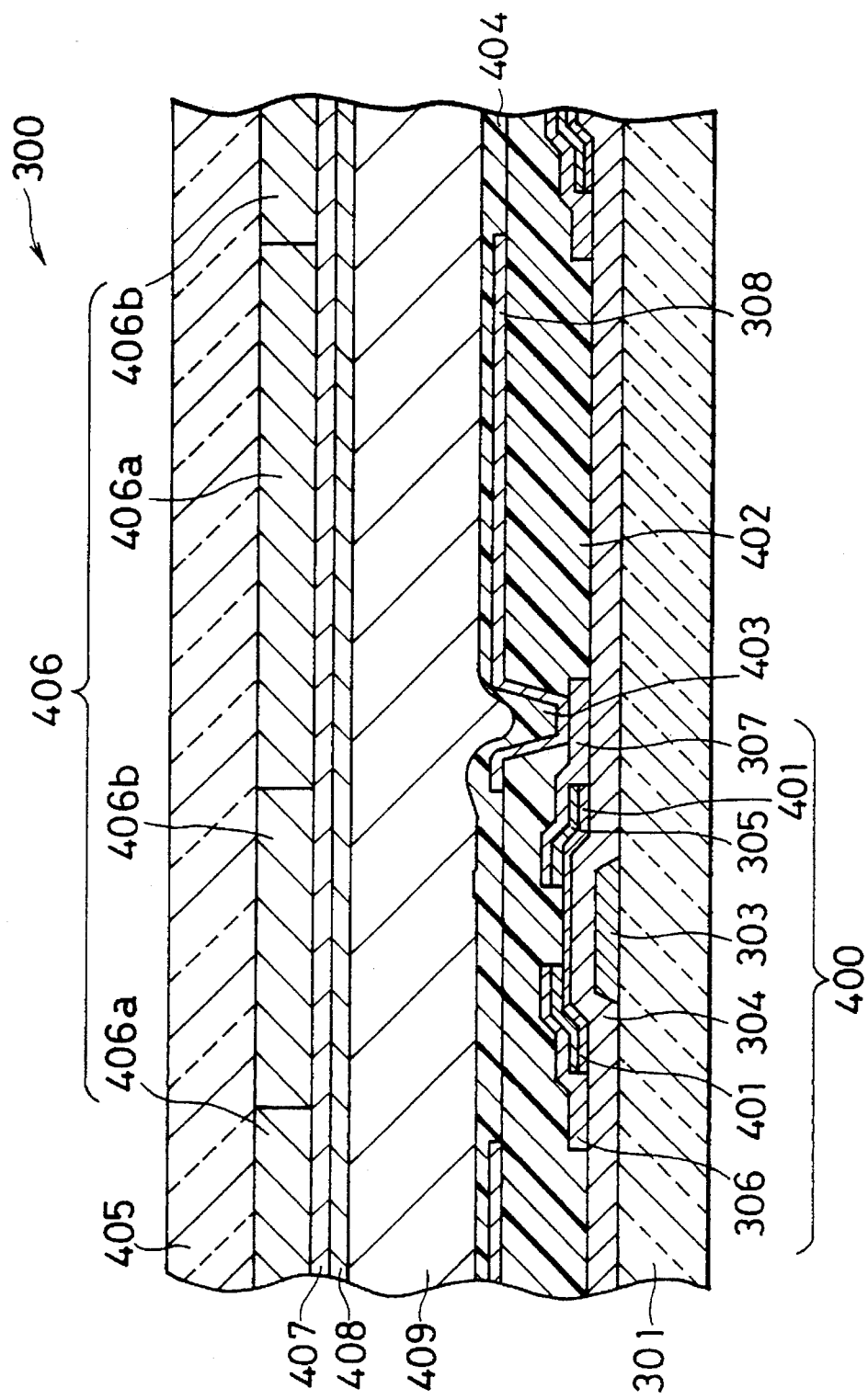
FIG. 14 is a sectional view showing a reflective type liquid crystal element according to a third embodiment.
Figure 15:
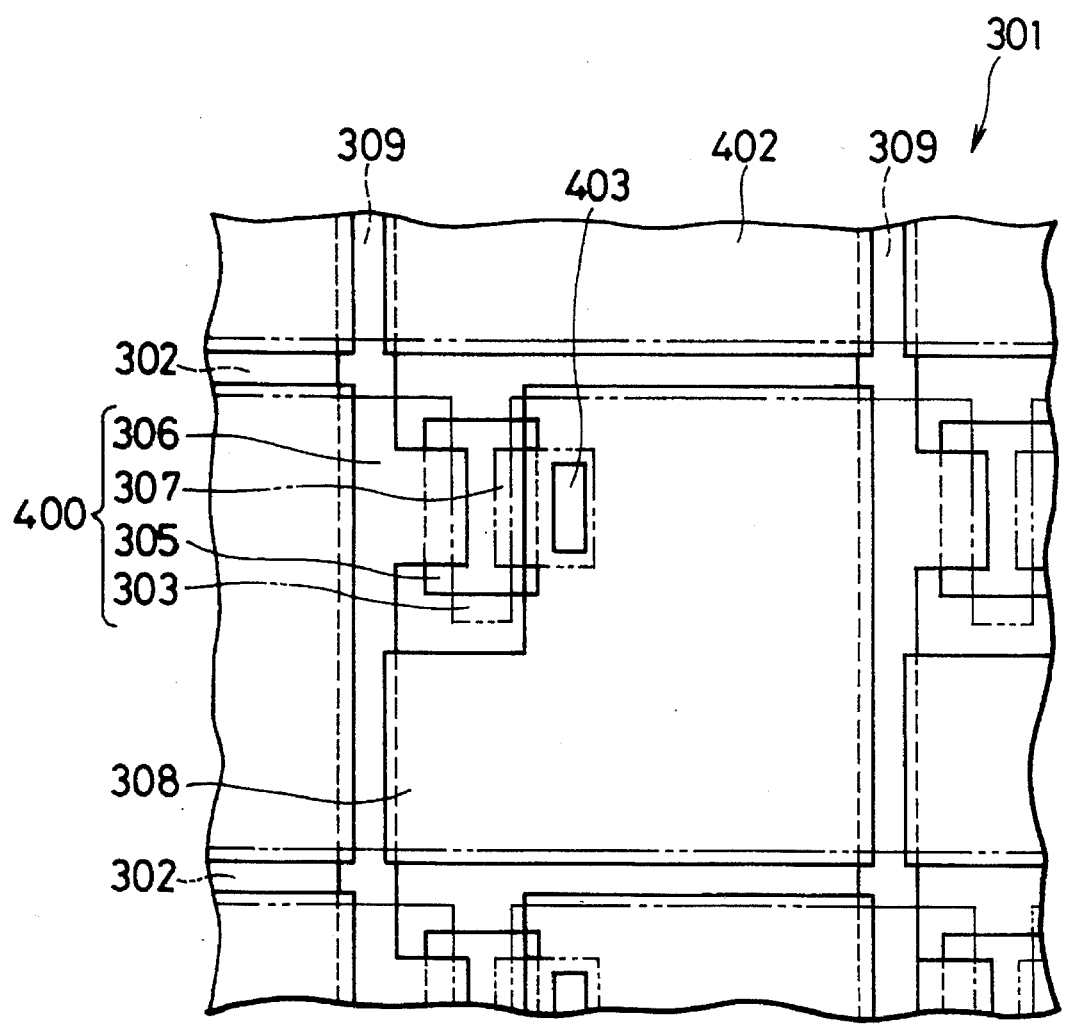
FIG. 15 is a plane view showing a reflective type liquid crystal element according to the third embodiment.

This embodiment illustrates the case where a transparent substrate made of glass is used for each of the substrates. FIG. 14 is a sectional view showing a reflective type liquid crystal element 300 according to an embodiment of the present invention. FIG. 15 is a plane view showing a substrate 301 shown in FIG. 14. On the insulated substrate 301 made of glass, there is formed a tantalum metal layer whose thickness is 3000Å by means of the sputtering technique. This metal layer is patterned by means of the photo lithography technique and the etching technique. Plural gate bus wires 302 made of a gate bus line 302 and the like are provided in parallel so that the gate bus line 302 may have a gate electrode 303 branched therefrom. The gate bus line 302 functions as a scan line. It is possible to use chromium for making the gate electrode 303 and the gate bus line 302. On the overall surface of the substrate 301 covering the gate electrode 303, there is formed a gate insulating film 304 made of silicon nitride ($SiN_x$) whose thickness is 4000Å by means of the plasma CVD technique. It is possible to use silicon oxide ($SiO_x$) for making the gate insulating film 304. On the gate insulating film 304 above the gate electrode 303, there is formed an amorphous silicon (a-Si) layer whose thickness is 1000Å, the layer served as a semiconductor layer 305. For the semiconductor layer 305, it is possible to use polycrystalline silicon CdSe. On both ends of the semiconductor layer 305, there is formed a contact electrode 401 made of an $n^+$ type a-Si layer whose thickness is 400Å. The formed a-Si layer and $n^+$ type a-Si layer are patterned. On one side of the contact electrode 301, a molybdenum metal-layer whose thickness is 2000Å is formed on the substrate 301 by means of the sputtering technique. By patterning the molybdenum metal layer, it is possible to form the source electrode 306. On the other side of the contact electrode 401, there is overlapped a drain electrode 307 made of molybdenum metal like the source electrode 306. For the source electrode 306 and the drain electrode 307, it is possible to use titanium or molybdenum.

As shown in FIG. 15, the source electrode 306 is connected to a source bus wire 309 crossed with the gate bus line 302 with the gate insulating film 304 laid therebetween. The gate bus electrode 309 functions as a signal line. The source electrode 309 is formed of the same metal as the source electrode 306. The gate electrode 303, the gate insulating film 304, the semiconductor layer 305, the source electrode 306 and the drain electrode 307 compose a thin film transistor (abbreviated as a TFT) 400, which has a switching function.

An organic insulating film 402 is formed of polyimide resin on the overall surface of the substrate 301 in a manner to cover the gate bus line 302, the source bus electrode 309 and the TFT 400. The thickness of the film is about 2 μm. On the drain electrode 307 of the organic insulating film 402, a contact hole 403 is formed by means of a photo-lithography technique or a dry-etching technique. On the organic insulating film 402, a reflective electrode 308 made of aluminum is formed. The reflective electrode 308 is connected to the drain electrode 307 through the contact hole 403. For the reflective electrode 308, it is possible to use silver.

On the substrate 405, a color filter 406 is formed. On the place of the color filter 406 corresponding to the reflective electrode 308 of the substrate 301, a magenta or green filter 406a is formed. On the other place, a black filter 406b is formed. On the overall surface of the color filter 406, a transparent electrode 407 made of ITO is formed. The thickness of the electrode 407 is 1000Å.

Next, a vertically orientating polyimide film (manufactured by Japan Synthesizing Rubber, Ltd.) is spin-coated on the reflective electrode 308 and the transparent electrode 407 and then is sintered at a temperature of 300° C. for forming orientation films 404 and 408. The thickness of each film is about 1000Å. Then, like the first embodiment, the rubbing process for orientation is performed on the orientation films 404 and 408. In this embodiment, the rubbing process is done at the same rubbing density as that in the first embodiment. Between the substrates 301 and 405, there is formed a space area where the liquid crystal 409 with negative dielectric anisotropy is sealed by performing screen printing of an adhesive sealing agent (not shown) containing spacers whose diameter is 7 μm mingled therein. By desiring the space in vacuum, the liquid crystal 409 with negative dielectric anisotropy is sealed. The foregoing process makes it possible to obtain the reflective type liquid crystal element 300.

The application of the reflective type liquid crystal element 300 obtained by this embodiment to the projection system of the second embodiment as shown in FIG. 18 makes it possible to obtain a very excellent image.

In the first to the third embodiments, the rubbing process is executed on both of the substrates, The reflective type liquid crystal element having one side where the rubbing process is done may offer the same display as the reflective type liquid crystal element having both sides where the rubbing process is done. Hence, the rubbing process should be performed on at least one side of the substrate.

Figure 8:
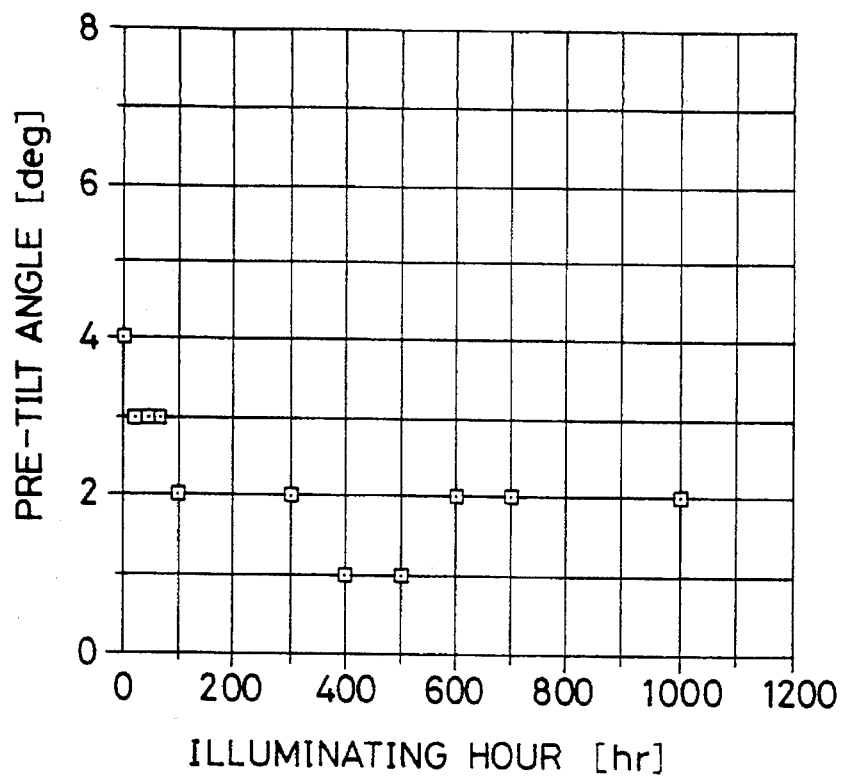
FIG. 8 is a graph showing aging change of a pre-tilt angle under the high illumination.

FIG. 8 shows the aging change (light aging) of the pre-tilt angle under the high illumination according to the present invention. The aging change is done when a ray of light of one million Lx or more is applied to the reflective type liquid crystal element according to the present invention, such a voltage as obtaining the maximum reflectance is applied to the element, and the element is driven at 1 KHz. Since a ray of light at high illuminance is applied to the liquid crystal element, the liquid crystal element is at the temperature of about 60° C. The pre-tilt angle of the liquid crystal element about which the light aging is done is prepared as large as about 4°, since the light illumination serves to reduce the pre-tilt angle. When this element is subject to the light aging, the pre-tilt angle is reduced from 4° to 2° for the first 100 hours. However, for 900 hours from 100th to 1000th hours, an angle is kept at 2°. This reduction of the tilt angle does not have any adverse effect on the display. Hence, the present invention enables to improve the light stability of the orientation.

Further, this embodiment uses a nematic liquid crystal having negative dielectric anisotropy. The liquid crystal used in the present invention is not limited to the liquid crystal.

Many widely different embodiments of the present invention may be constructed without departing from the spirit and the scope of the present invention. It should be understood that the present invention is not limited to the specific embodiments described in the specification, except as defined in the appended claims.

What is claimed is:

1. A liquid crystal projector having a reflective type liquid crystal element including opposed substrates and a liquid crystal layer between said substrates, said projector for projecting a light image generated by said reflective type liquid crystal element, said projector comprising an orienting means disposed in said reflective type liquid crystal element for orienting liquid crystal molecules of said liquid crystal layer, said orienting means being made of a polyimide film with a vertical orientating characteristic, and being rubbed so as to orient said liquid crystal molecules at a predetermined angle of inclination as a pre-tilt angle, and said liquid crystal layer comprising a nematic liquid crystal with a negative dielectric anisotropy having an operating mode of the deformation of vertical aligned phase type electrically controlled birefringence mode.

2. A liquid crystal projector claimed in claim 1, wherein at least one of said opposed substrates is transparent.

3. A liquid crystal projector claimed in claim 1, wherein at least one of said opposed substrates is made of monocrystalline silicon.

4. A liquid crystal projector claimed in claim 1, wherein said reflective type liquid crystal element is an optical addressed type liquid crystal light valve.

5. A liquid crystal projector claimed in claim 1, wherein said pre-tilt angle is 5° or less with respect to a vertical angle of said substrate.

6. A liquid crystal projector claimed in claim 1, wherein said orienting means is formed on at least one of said opposed substrates.

* * * * *